United States Patent
Lin

(10) Patent No.: US 8,662,002 B2
(45) Date of Patent: Mar. 4, 2014

(54) RETRACTABLE POST ASSEMBLY WITH ALARM FUNCTION

(75) Inventor: Chien-Ting Lin, Santa Fe Springs, CA (US)

(73) Assignee: Linco Inc., Santa Fe Springs, CA (US)

( * ) Notice: Subject to any disclaimer, the term of this patent is extended or adjusted under 35 U.S.C. 154(b) by 218 days.

(21) Appl. No.: 13/190,465

(22) Filed: Jul. 25, 2011

(65) Prior Publication Data

US 2012/0025040 A1 Feb. 2, 2012

(30) Foreign Application Priority Data

Jul. 27, 2010 (CN) ...................... 2010 2 0272227 U

(51) Int. Cl.
 *F16M 11/28* (2006.01)
 *G08B 3/00* (2006.01)
 *G08B 5/00* (2006.01)

(52) U.S. Cl.
 USPC ...................... 116/67 R; 116/137 R; 248/542

(58) Field of Classification Search
 USPC ........ 116/67 R, 1, 137 R, 200; 248/542, 543; 340/404, 540, 690
 See application file for complete search history.

(56) References Cited

U.S. PATENT DOCUMENTS

| 1,458,060 | A | * | 6/1923 | Hurl | 116/67 R |
|---|---|---|---|---|---|
| 1,737,514 | A | * | 11/1929 | Nikolish | 116/67 R |
| 2,692,924 | A | * | 10/1954 | Williams et al. | 200/85 R |
| 3,594,773 | A | * | 7/1971 | Conkle et al. | 340/690 |
| 3,786,503 | A | * | 1/1974 | Webb et al. | 405/272 |
| 4,426,642 | A | * | 1/1984 | Poffenbarger | 340/690 |
| 4,660,679 | A | * | 4/1987 | Ostrobrod | 182/18 |
| 5,445,352 | A | * | 8/1995 | Long | 248/354.5 |
| 6,481,365 | B1 | * | 11/2002 | Currie et al. | 116/67 R |
| 6,957,166 | B1 | * | 10/2005 | Howie et al. | 702/173 |
| 7,852,229 | B1 | * | 12/2010 | Gohl | 340/685 |

FOREIGN PATENT DOCUMENTS

| JP | 09313635 A | * 12/1997 | A62C 13/78 |
|---|---|---|---|
| JP | 2000251172 A | * 9/2000 | G08B 21/00 |

* cited by examiner

*Primary Examiner* — R. A. Smith

(57) ABSTRACT

A retractable post assembly with alarm function is disclosed. The retractable post assembly includes: a stationary post being a column member; a moveable post being a column member and moveably sleeved with the stationary post; and an alarm device, such as an air whistle, an electrically-controlled buzzer unit, and an electrically-controlled alarm lamp unit, installed in the retractable post assembly at a proper location. When the moveable post is making a relative movement with respect to the stationary post, the alarm device senses the movement and raises an alarm accordingly.

2 Claims, 6 Drawing Sheets

US 8,662,002 B2

RETRACTABLE POST ASSEMBLY WITH ALARM FUNCTION

BACKGROUND OF THE INVENTION

1. Field of the Invention

The present invention relates to a post assembly for a stand, and more particular to a retractable post assembly with alarm function.

2. The Prior Arts

In photographing, radio and television, movie making, and live broadcast industries, many photographing, image capturing, and illuminating apparatuses are required. These apparatuses need professional stands during use. Since these apparatuses all have considerable weight, a moveable post of a retractable post assembly may be loosened and falling down relative to a stationary post of the retractable post assembly due to the weight, or other factors. If the retractable post assembly is combined with a suitable alarm device for informing personnel nearby, these sudden events can be immediately and properly handled, for example making adjustment of the relative position between the moveable post and the stationary post, or checking whether or not the retractable post assembly is damaged.

In view that the conventional retractable post assembly is not able to raise an alarm at the time of an abnormal situation, e.g. sudden fall of the moveable post relative to the stationary post of the conventional retractable post assembly, it is desired to provide a retractable post assembly with alarm function, thereby immediately informing personnel nearby to handle this sudden event.

SUMMARY OF THE INVENTION

A primary objective of the present invention is to provide a retractable post assembly with alarm function that can immediately inform personnel nearby to handle sudden events.

In order to achieve the aforementioned objective, a retractable post assembly with alarm function in accordance with the present invention comprises a stationary post being a column member; a moveable post being a column member and moveably sleeved with the stationary post; and an alarm device installed in the retractable post assembly at a proper location. When the moveable post is making a relative movement with respect to the stationary post, the alarm device senses the movement and raises an alarm accordingly.

With the technical solution provided by the present invention, when an abnormal situation occurs, e.g. sudden fall of the moveable post relative to the stationary post of the retractable post assembly, an alarm can be raised for allowing personnel nearby to be aware of and rapidly handle the sudden event, so as to avoid inducing a further problem.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

Figure 1:
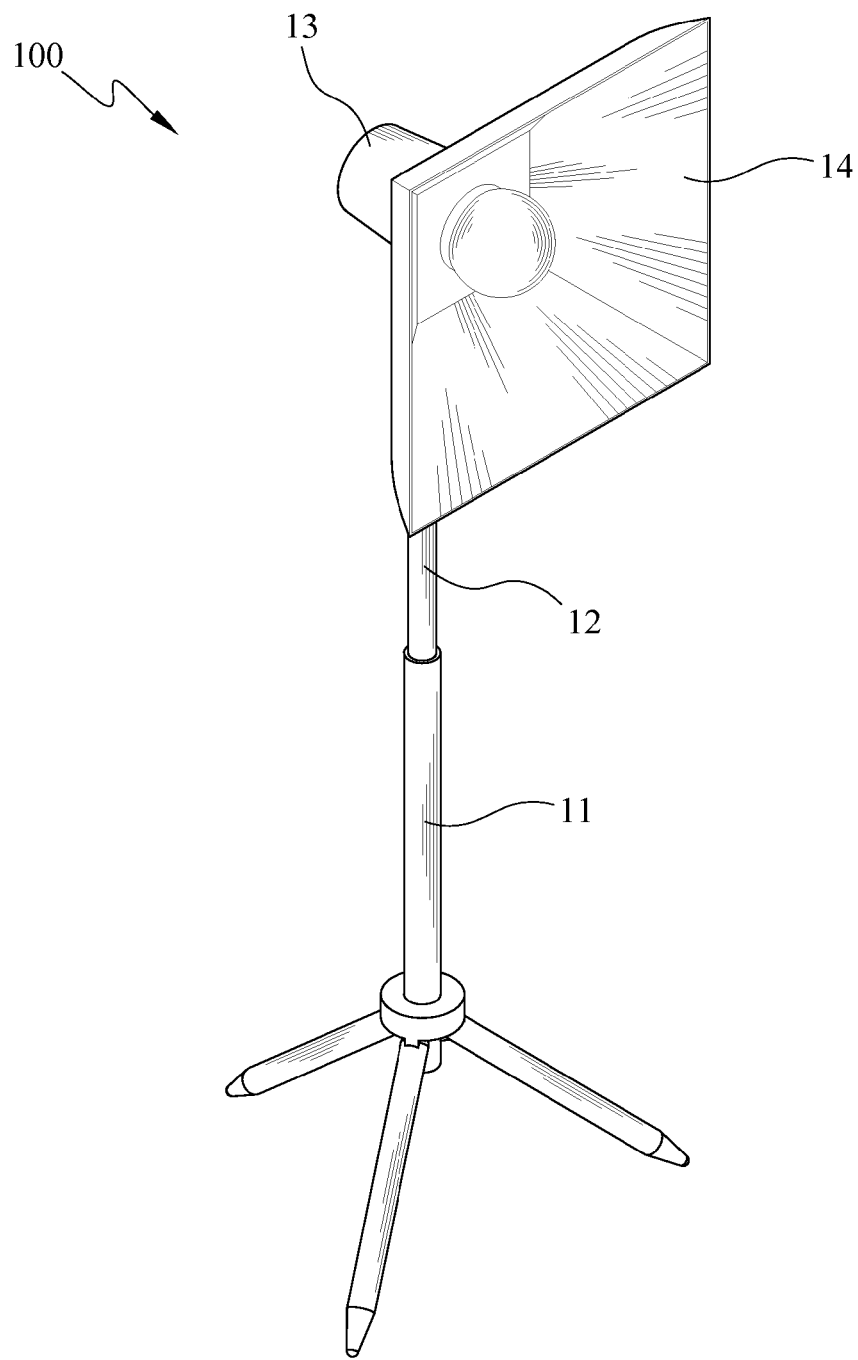
FIG. 1 is a schematic view of a conventional retractable post assembly.

Please refer to FIG. 1, which is a schematic view of a conventional retractable post assembly. The retractable post assembly 100 includes a stationary post 11, a moveable post 12, and a mounting portion 13 for use in mounting a photographing lamp 14.

Figure 2A:
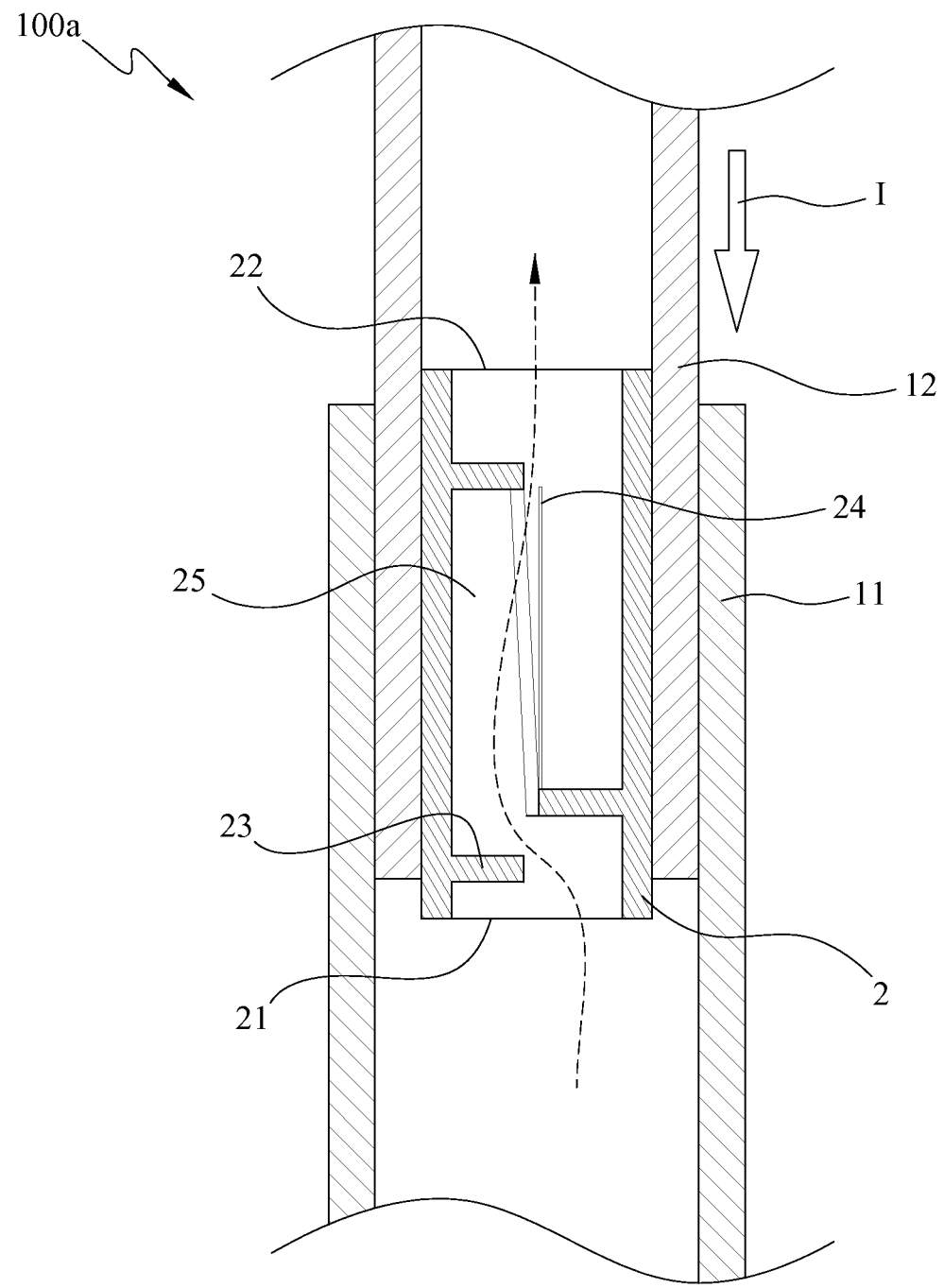
FIG. 2A is a cross sectional view showing a retractable post assembly with alarm function according to a first embodiment of the present invention.

Referring to FIG. 2A, a retractable post assembly 100a according to a first embodiment of the present invention is capable of raising an alarm during relative retraction of the retractable post assembly. The retractable post assembly 100a includes a stationary post 11 and a moveable post 12, both of which are column members and moveably sleeved together. An alarm device is installed in the retractable post assembly at a proper location. In this embodiment, the alarm device is a pneumatic sound generator, such as an air whistle 2. According to this embodiment, the air whistle 2 is arranged inside the moveable post 12 for illustrative purpose, but not limited thereto. The air whistle 2 may also be arranged at other proper locations.

The air whistle 2 includes an air inlet 21 and an air outlet 22. The air whistle 2 is equipped with a plurality of partitions 23 therein that defines an air passage 25. A sounding diaphragm 24 is disposed across the air passage 25. When the moveable post 12 is making a relative movement with respect to the stationary post 11, for example the moveable post 12 is suddenly loosened and falling downward along a first direction I, the air pressure instantaneously generated inside the retractable post assembly enables air to enter into the air whistle 2 from the air inlet 21, pass through the air passage 25 and the sounding diaphragm 24, and then exit the air whistle 2 through the air outlet 22, thereby raising an alarm sound.

Figure 2B:
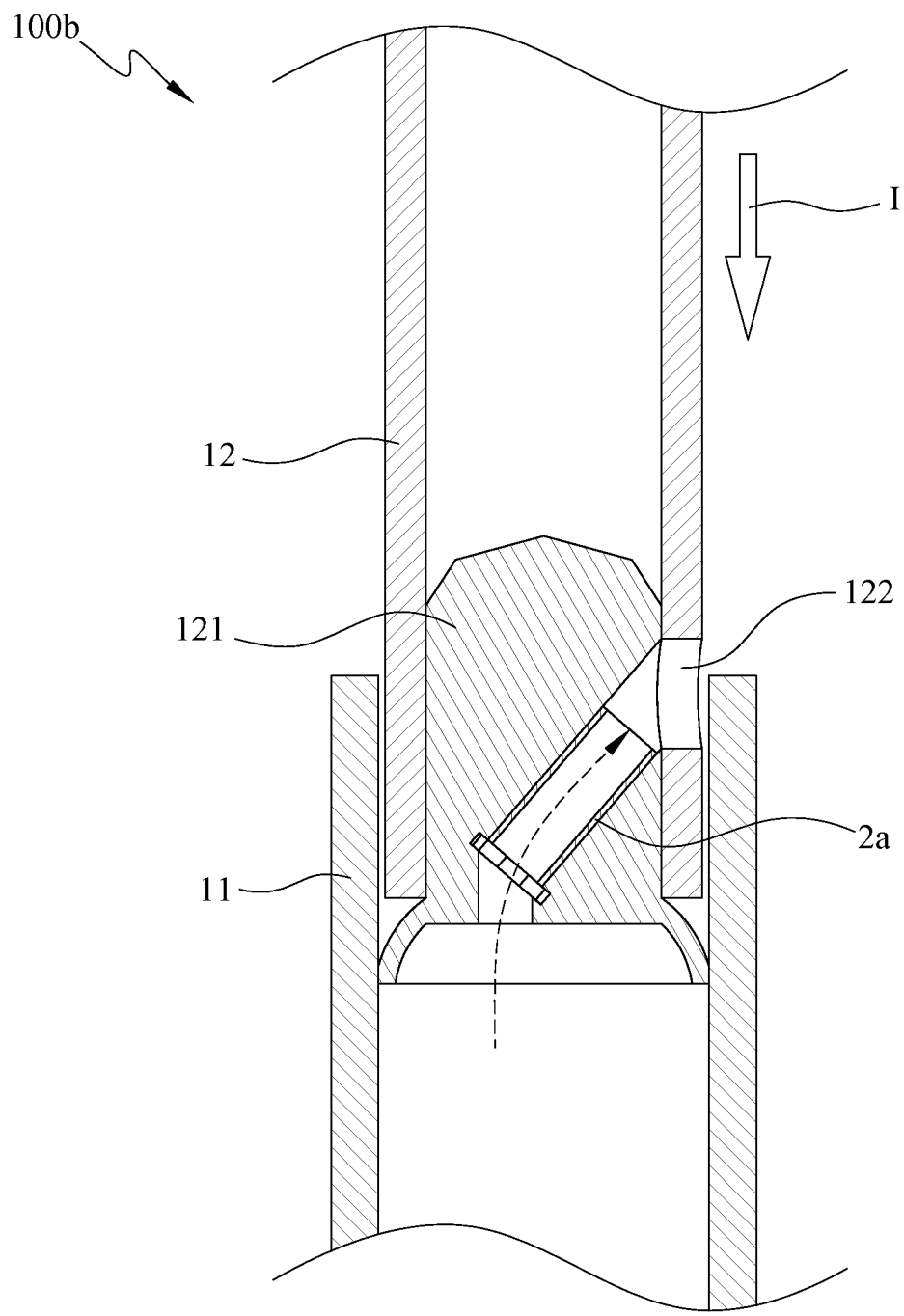
FIG. 2B is a cross sectional view showing a retractable post assembly with alarm function according to a second embodiment of the present invention.

Please refer to FIG. 2B, which is a cross sectional view showing a retractable post assembly 100b with alarm function according to a second embodiment of the present invention. An air whistle 2a is installed in a tube member 121 that is inserted in the moveable post 12 of the retractable post assembly 100b. The moveable post 12 has an opening 12 at a side wall thereof. When the moveable post 12 is making a relative movement with respect to the stationary post 11, for example the moveable post 12 is suddenly loosened and falling downward along a first direction I, the air pressure instantaneously generated inside the retractable post assembly enables the air whistle 2 to raise an alarm sound, which can be directly transmitted out of the opening 122 of the moveable post 12.

Figure 3:
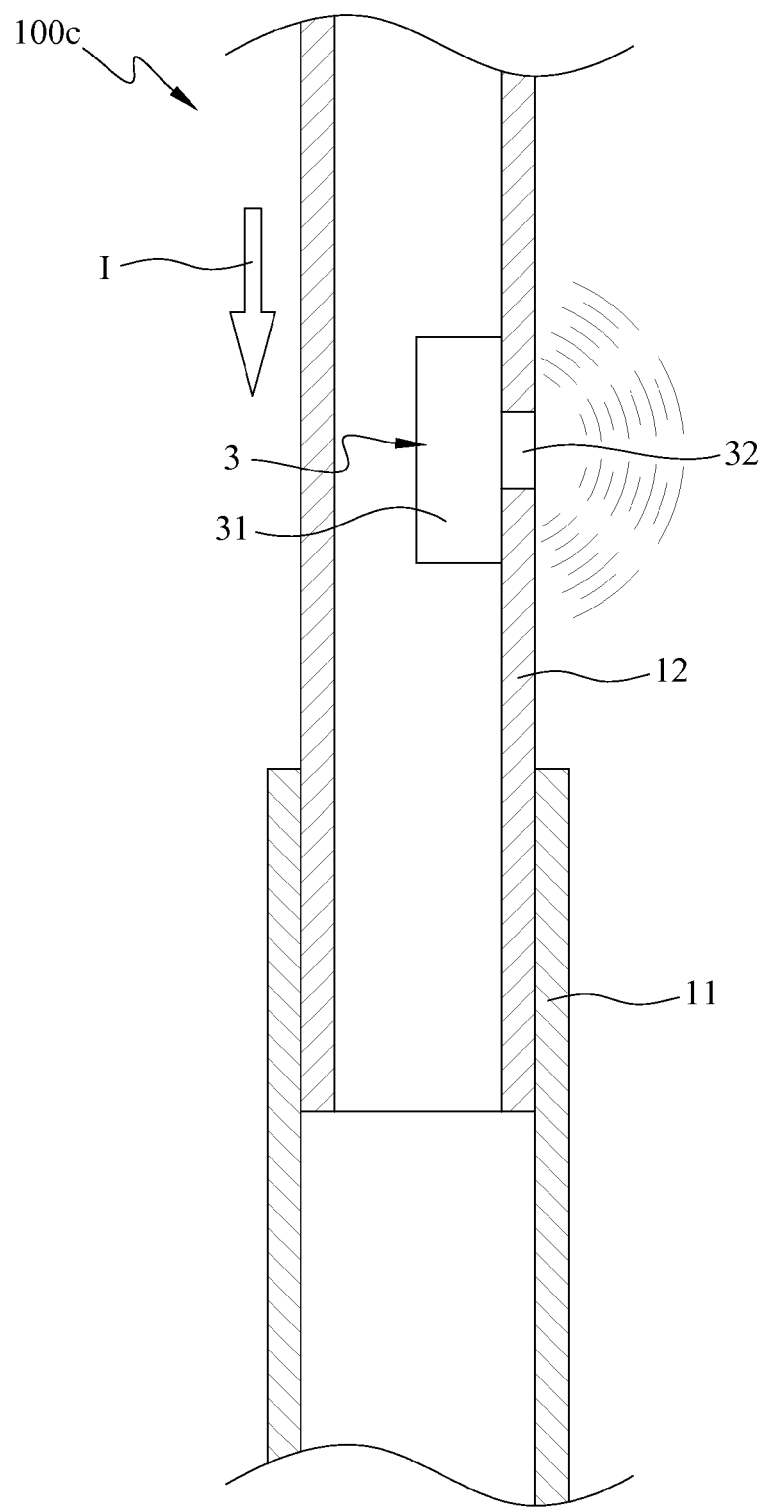
FIG. 3 is a cross sectional view showing a retractable post assembly with alarm function according to a third embodiment of the present invention.

Please refer to FIG. 3, which is a cross sectional view showing a retractable post assembly with alarm function according to a third embodiment of the present invention. The retractable post assembly 100c according to this embodiment also includes a stationary post 11 and a moveable post 12, which have a similar structure to the first embodiment. Thus, there is no need to describe again here. An alarm device is installed in the retractable post assembly 100c at a proper location. In this embodiment, the alarm device is an electrically-controlled buzzer unit 3 including a sensor 31 and a buzzer 32. When the moveable post 12 is making a relative movement with respect to the stationary post 11, the sensor 31 of the electrically-controlled buzzer unit 3 can sense the movement and actuate the buzzer 32 to raise an alarm sound accordingly.

Figure 4:
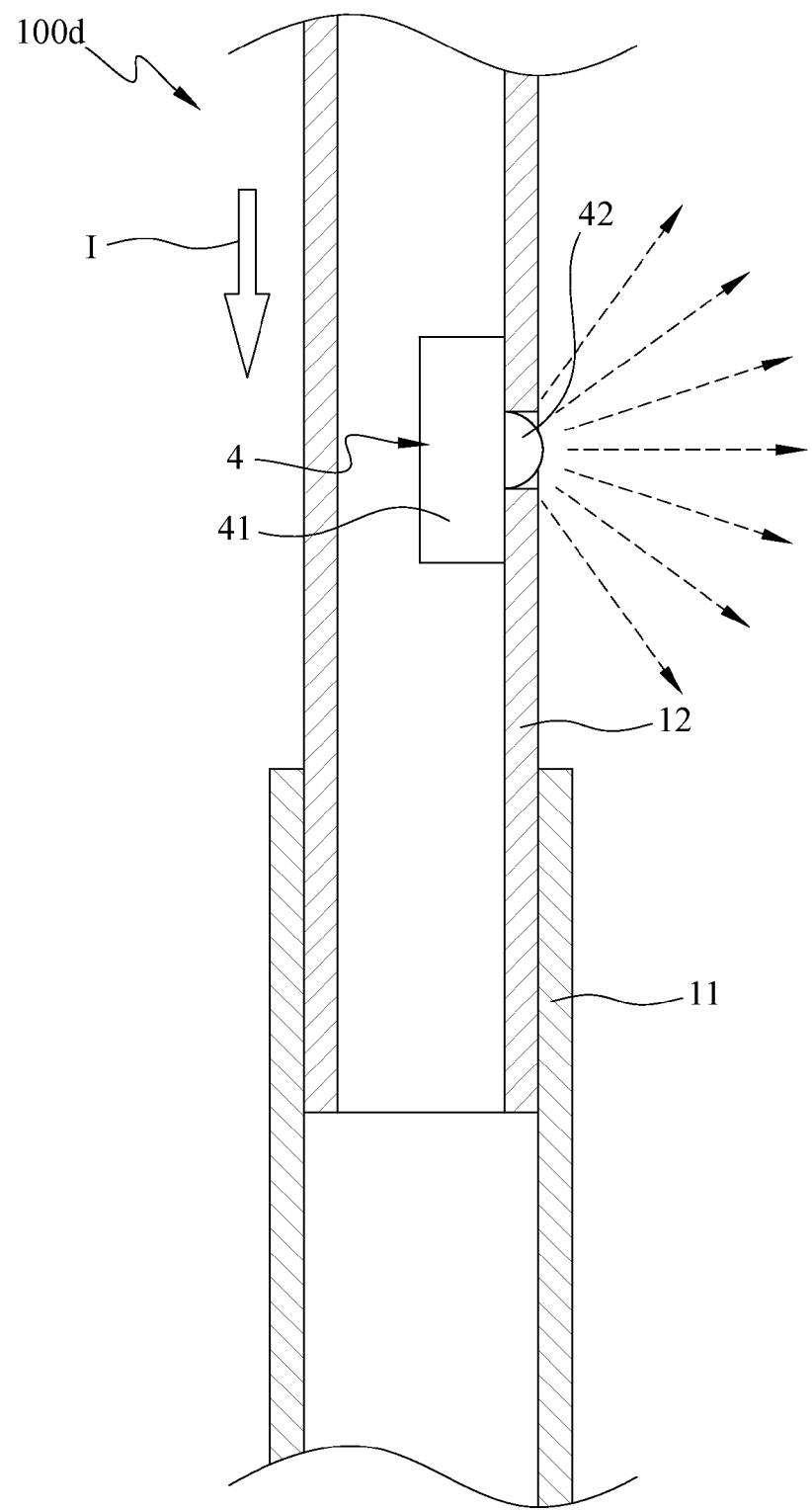
FIG. 4 is a cross sectional view showing a retractable post assembly with alarm function according to a fourth embodiment of the present invention.

Please refer to FIG. 4, which is a cross sectional view showing a retractable post assembly with alarm function according to a fourth embodiment of the present invention. The retractable post assembly 100d according to this embodiment also includes a stationary post 11 and a moveable post 12, which have a similar structure to the above-mentioned embodiments. Thus, there is no need to describe again here. An alarm device is installed on the retractable post assembly 100d at a proper location. In this embodiment, the alarm device is an electrically-controlled alarm lamp unit 4 including a sensor 41 and an alarm lamp 42. When the moveable post 12 is making a relative movement with respect to the stationary post 11, the sensor 41 of the electrically-controlled alarm lamp unit 4 can sense the movement and actuate the alarm lamp 42 to emit light accordingly.

The sensors disclosed in each embodiment of the present invention are used to sense a change of physical quantities including, but not limited to, acceleration and displacement during relative movement between the moveable post and the stationary post of the retractable post assembly.

Figure 5:
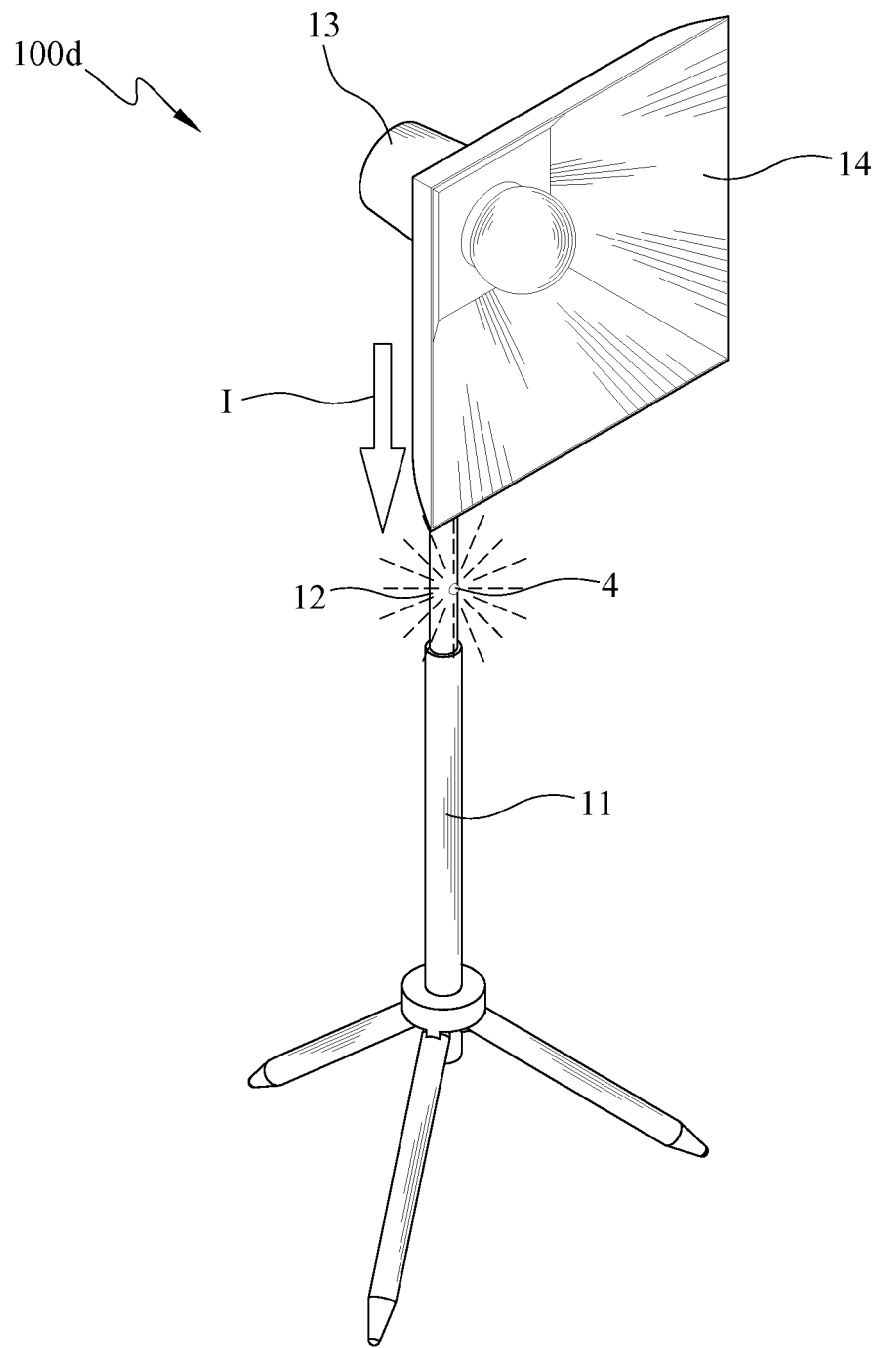
FIG. 5 is a schematic view showing that the retractable post assembly of the present invention raises an alarm.

FIG. 5 is a schematic view showing that the retractable post assembly according to the fourth embodiment of the present invention raises an alarm. When the moveable post 12 is making a relative movement with respect to the stationary post 11, for example the moveable post 12 is suddenly loosened and falling downward along the first direction I, the sensor 41 of the electrically-controlled alarm lamp unit 4 senses the downward movement, and then the alarm lamp 42 is actuated to emit light, so that personnel nearby can be alerted to handle the sudden event.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A retractable post assembly with alarm function comprising:
   a stationary post being a column member;
   a moveable post being a column member and moveably sleeved with the stationary post; and
   an alarm device installed in the retractable post assembly at a proper location, wherein when the moveable post is making a relative movement with respect to the stationary post, the alarm device senses the movement and raises an alarm accordingly;
   wherein the alarm device is a pneumatic sound generator installed in the moveable post or the stationary post, and when the moveable post is making a relative movement with respect to the stationary post, the air pressure instantaneously generated inside the retractable post assembly enables air to pass through the pneumatic sound generator to raise a sound alarm.

2. The retractable post assembly according to claim 1, wherein the pneumatic sound generator is an air whistle.

* * * * *